June 19, 1923.                                                          1,459,287
A. DIAZ
SUSPENSION OF MOTOR CARS AND OTHER VEHICLES
Filed Feb. 10, 1922                    2 Sheets-Sheet 1
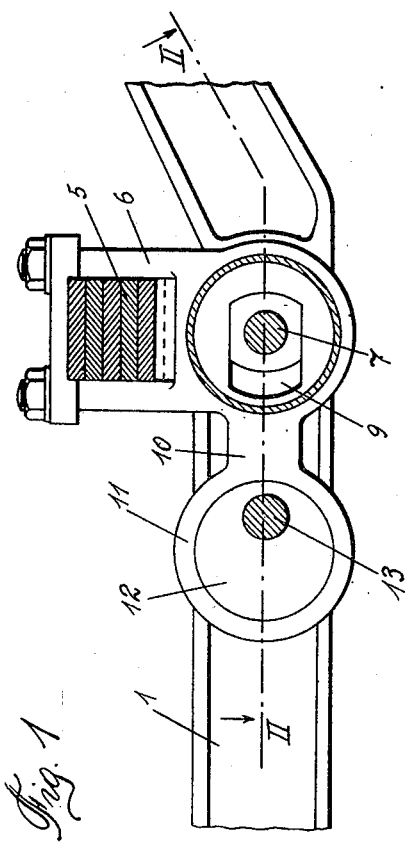
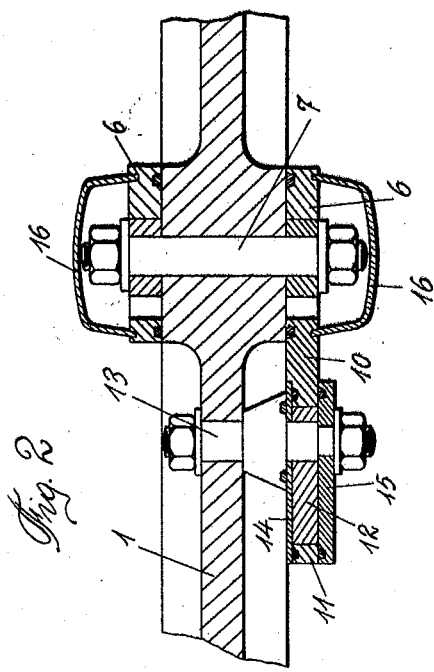
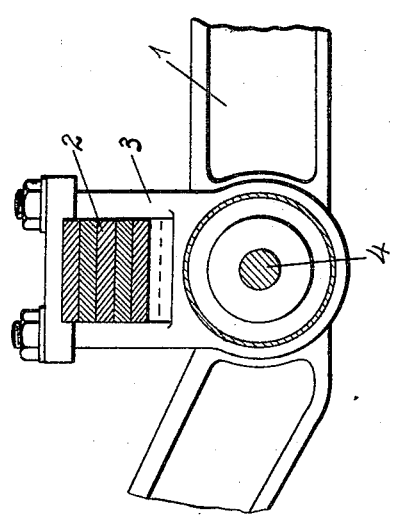
Inventor
Antonio Díaz
By Lawrence Langner
Atty June 19, 1923.
A. DIAZ
1,459,287
SUSPENSION OF MOTOR CARS AND OTHER VEHICLES
Filed Feb. 10, 1922     2 Sheets-Sheet 2
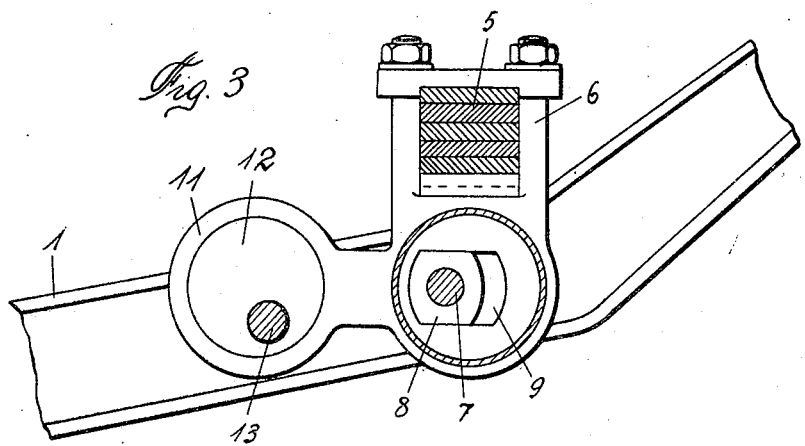
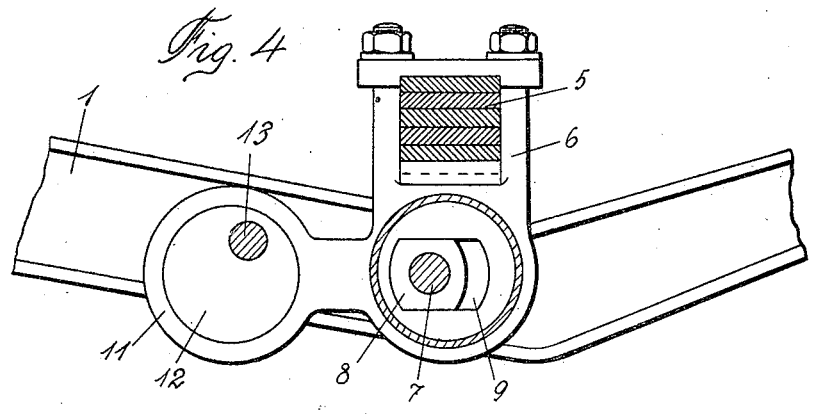
Inventor
Antonio Diaz
By Lawrence Langner
Att'y Patented June 19, 1923.

1,459,287

UNITED STATES PATENT OFFICE.

ANTONIO DÍAZ, OF BARCELONA, SPAIN, ASSIGNOR TO JOSÉ F. DEL CASTILLO, OF BARCELONA, SPAIN.

SUSPENSION OF MOTOR CARS AND OTHER VEHICLES.

Application filed February 10, 1922. Serial No. 535,666.

*To all whom it may concern:*

Be it known that I, ANTONIO DÍAZ, a subject of the King of Spain, and resident of Barcelona, in the Kingdom of Spain, have invented certain new and useful Improvements in the Suspension of Motor Cars and Other Vehicles, of which the following is a specification.

In the suspensions generally used for motor cars and other vehicles, the leaf springs are rigidly fixed to the axle of the wheels by means of fixing clamps which do not permit of any relative movement between the springs and the axle, and the connection of the springs with the frame of the vehicle is effected by means of joints which allow the extension of the spring, produced by its deflection, but no lateral inclination is possible in relation to the frame of the vehicle. In these suspensions, when the axle inclines on account of one of the wheels passing an obstacle or a hole in the road, the result is that the spring suffers a turning movement in the part joined to the axle, and as on account of the part joined to the frame it is compelled to retain the same level, the spring is subjected in addition to the deflection to a more or less great effort of torsion, according to the inclination taken by the axle, but always appreciable and the cause of most of the breakages of springs. In order to avoid this difficulty, various suspensions for motor cars have been designed in which the springs are not joined rigidly to the axle, but are joined thereto in such a manner that the spring can turn angularly relatively to the axle, and when the axle inclines on account of one of the wheels passing an obstacle, the spring can always remain vertical. In this way the torsion of the spring is avoided which is due to the inclination which the latter takes when the axle inclines, but the spring is still subjected to a damaging strain of appreciable magnitude on account of the fact that when the axle inclines, its projection over the horizontal plane shortens and therefore even when the section of the spring joined to the axle remains vertical, that section displaces itself laterally in relation to its original position, and this lateral movement of one part of the spring, whilst the other parts are joined to the frame permanently in an unalterable position, submits the spring to lateral forces that render its good working difficult and often also cause it to break.

According to the present invention the above difficulties are removed, and the spring remains always in the same plane, even if the axle inclines in one direction or the other, so that the spring works under excellent conditions. The invention consists broadly in mounting on the axle by means of pins or small transverse shafts the clamps which hold the two main springs of the vehicle and in providing means whereby the clamp of one of these two springs can glide within limits above the axle. For this purpose the pivoting pin of the clamp passes through an elongated slot or loop on the clamp so that not only can the clamp turn around this pin, but it can also glide in the longitudinal direction of the axle, with the result that when this axle inclines, the clamp and the spring glide relatively to one another and thereby neutralize the shortening of the horizontal projection of the axle. With the object of causing this gliding of the clamp which carries the spring to take place automatically on its joint pin, the clamp is formed with a lateral extension terminating in a collar around an eccentric mounted freely on a transverse pin or shaft fixed to the axle of the vehicle. In this manner, when the axle of the vehicle inclines because of the wheels passing over an obstacle or a hole in the road, the two springs tend by themselves to remain in their original vertical plane, causing the clamps to oscillate suitably on their joint pins. The particular clamp, that has the gliding movement in addition to the revolving movement, provokes a rotation of the eccentric, and this rotation produces automatically the gliding of the clamp, so that it counteracts the shortening of the horizontal projection of the vehicle axle.

In the attached drawing there is shown by way of example a motor car axle provided with the suspension improvements, constituting the present invention. Figure 1 is a front view of the axle. Figure 2 is a section through the line II—II of Figure 1, and Figures 3 and 4 show in front elevation the positions taken by the various organs of the joint when the axle inclines in one direction or the other.

The axle 1 of the vehicle carries fixed the two springs 2 and 5 by means of fixing clamps 3 and 6 which are joined to the vehicle axle by means of joint pins 4 and 7 respectively, so that when the axle inclines, the clamps carrying the springs can revolve around these joint pins with the result that the clamps and therefore the section of the springs held by same always remain in the same plane, that is to say, vertical.

The invention further consists in arranging one of the clamps 6 in such a manner that besides the revolving movement around the joint pin 7 there can be a gliding movement in the direction of the axle with the object that when the axle inclines and therefore diminishes the horizontal projection of the distance between the joint pins 4 and 7, the clamp 6 can glide to counteract that shortening of distance. For this purpose the clamp 6 is provided with a loop 9 and the joint pin 7 has a bearing 8 on which the loop 9 can glide. In order to obtain automatically this gliding of the clamp 6 on the bearing 8, the clamp presents a lateral prolongation 10 which terminates in a collar 11 encircling an eccentric 12 mounted freely on a shaft or pin 13 fixed to the axle 1 of the vehicle. In this manner when the axle 1 inclines and assumes the position represented in Figure 3 or in Figure 4, the clamp 6 in tending to remain vertical through the action of the spring 5 revolves around the joint pin 7 and consequently the arm 10 and the collar 11 also turn around this pin 7, in consequence of which movement the eccentric 12 is compelled to revolve around the shaft or pin 13 until assuming the positions shewn in Figures 3 and 4, and on account of its eccentricity pushes the whole of the clamp 6 to the right, as represented in the same drawings.

The dimensions of the eccentric 12 and the position of its pin in relation to the joint pin 7 are suitably selected in each case, in such a manner that the gliding of the clamp 6 shall be in proportion to the inclination of the axle 1 and therefore counteract the shortening experienced by the horizontal projection of the distance between the joint pins 4 and 7 when the axle inclines in one direction or the other.

It will be understood that this mechanism can be mounted in different ways, for example so that the springs remain on top of the axle as represented in the drawings, or so that the springs are underneath the axle.

What I claim is:—

1. In the spring suspension of motor cars and other vehicles, clamps for receiving springs, said clamps being rotatably mounted on the axle, by means of pins, one of the clamps on an axle being provided with a slot for receiving its pin, whereby the clamp is simultaneously rotatable and slidable on the pin.

2. In the spring suspension of motor cars and other vehicles clamps rotatably mounted on the axle and thereby securing the springs to the axle and means whereby one of said clamps can revolve and glide at the same time, said means comprising a lateral extension on the clamp, a terminating collar on said extension, a pin on the axle, and an eccentric mounted freely on said pin and encircled by the aforesaid collar whereby when the axle of the vehicle inclines and the clamp revolves in order to maintain itself in the vertical plane, there is effected at the same time a revolving of the eccentric around its pin whereupon said eccentric, on account of its eccentricity, causes the clamp to glide the correct amount to balance the shortening of the horizontal projection of the axle due to its inclination.

3. In spring suspensions according to claim 1, in combination with means for insuring sliding of said one clamp on its pin, at the same time that it rotates on said pin, whereby to maintain constant, the horizontal distance between two springs, regardless of the inclination of the axle.

Signed at Barcelona, Spain, in the Province of Barcelona and Kingdom of Spain this 3rd day of January A. D. 1922.

ANTONIO DÍAZ.